(12) United States Patent  
Tsujikawa

(10) Patent No.: US 9,418,665 B2
(45) Date of Patent: Aug. 16, 2016

(54) METHOD FOR CONTROLLING DEVICE AND DEVICE CONTROL SYSTEM

(71) Applicant: Panasonic Intellectual Property Corporation of America, Torrance, CA (US)

(72) Inventor: Misaki Tsujikawa, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/741,723

(22) Filed: Jun. 17, 2015

(65) Prior Publication Data

US 2015/0287414 A1  Oct. 8, 2015

Related U.S. Application Data

(63) Continuation of application No. PCT/JP2014/004200, filed on Aug. 18, 2014.

(60) Provisional application No. 61/871,605, filed on Aug. 29, 2013.

(30) Foreign Application Priority Data

Jul. 17, 2014 (JP) .................................. 2014-146692

(51) Int. Cl.
*G10L 21/00* (2013.01)
*G10L 17/22* (2013.01)
*G10L 15/20* (2006.01)
*G10L 21/0208* (2013.01)

(52) U.S. Cl.
CPC ................. *G10L 17/22* (2013.01); *G10L 15/20* (2013.01); *G10L 21/0208* (2013.01)

(58) Field of Classification Search
USPC .......................... 704/246, 247, 251, 252, 275
See application file for complete search history.

(56) References Cited

U.S. PATENT DOCUMENTS

2009/0299745 A1* 12/2009 Kennewick ............. G10L 15/32
704/257
2012/0034904 A1* 2/2012 LeBeau .................. G10L 15/265
455/414.1

(Continued)

FOREIGN PATENT DOCUMENTS

| JP | 57-212495 | 12/1982 |
| JP | 2000-029500 | 1/2000 |
| JP | 2002-182679 | 6/2002 |

(Continued)

OTHER PUBLICATIONS

International Search Report of PCT application No. PCT/JP2014/004200 dated Sep. 9, 2014.

*Primary Examiner* — Leonard Saint Cyr
(74) *Attorney, Agent, or Firm* — Greenblum & Bernstein, P.L.C.

(57) ABSTRACT

A device control system includes an ambient sound obtainer that obtains ambient sound around the plurality of devices at a first time, an operation state obtainer that obtains the operation states of the plurality of devices at the first time from the plurality of devices through a network, and a database manager that stores the operation states at the first time obtained by the operation state obtainer and the ambient sound obtained by the ambient sound obtainer at the first time in a database while associating the operation states and the ambient sound with each other.

12 Claims, 13 Drawing Sheets

(56) References Cited

U.S. PATENT DOCUMENTS

2012/0035931 A1* 2/2012 LeBeau ................ G10L 15/265
　　　　　　　　　　　　　　　　　　　704/251
2013/0095805 A1* 4/2013 LeBeau ................ G10L 15/265
　　　　　　　　　　　　　　　　　　　455/414.1

FOREIGN PATENT DOCUMENTS

| JP | 2005-090838 | 4/2005 |
| JP | 2006-058479 | 3/2006 |
| JP | 2007-065122 | 3/2007 |

\* cited by examiner

FIG. 4

| DEVICE A | DEVICE B | DEVICE C | AMBIENT SOUND PATTERN |
|----------|----------|----------|-----------------------|
| ON | ON | HIGH | XXX01.wav |
| ON | ON | LOW | XXX02.wav |
| ON | OFF | HIGH | XXX03.wav |
| ON | OFF | LOW | XXX04.wav |
| OFF | ON | HIGH | XXX05.wav |
| OFF | ON | LOW | XXX06.wav |
| ⋮ | ⋮ | ⋮ | ⋮ |

METHOD FOR CONTROLLING DEVICE AND DEVICE CONTROL SYSTEM

BACKGROUND

1. Technical Field

The present disclosure relates to a method for controlling a device and a device control system that control a plurality of devices on the basis of a speech command from a user.

2. Description of the Related Art

As a result of recent development of speech recognition technologies, various devices can be controlled through speech recognition.

Furthermore, a method for controlling a device in which a microphone provided in a house receives speech inputs and a plurality of devices connected to one another through a network are controlled has been proposed (for example, refer to Japanese Unexamined Patent Application Publication No. 2002-182679).

SUMMARY

The method for controlling a device in the above example of the related art needs further improvements.

In one general aspect, the techniques disclosed here feature a method for controlling a device used for controlling a plurality of devices provided in a house on the basis of a speech command from a user. The method includes the steps of obtaining ambient sound around the plurality of devices at a first time, obtaining operation states of the plurality of devices at the first time from the plurality of devices through a network, and storing, in a database, the operation states of the plurality of devices at the first time obtained in the step of obtaining the operation states of the plurality of devices at the first time and the ambient sound obtained at the first time in the step of obtaining the ambient sound while associating the operation states and the ambient sound with each other.

According to the present disclosure, further improvements can be achieved in controlling a device through speech recognition.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of the data structure of the ambient sound information database;

DETAILED DESCRIPTION

Figure 1:
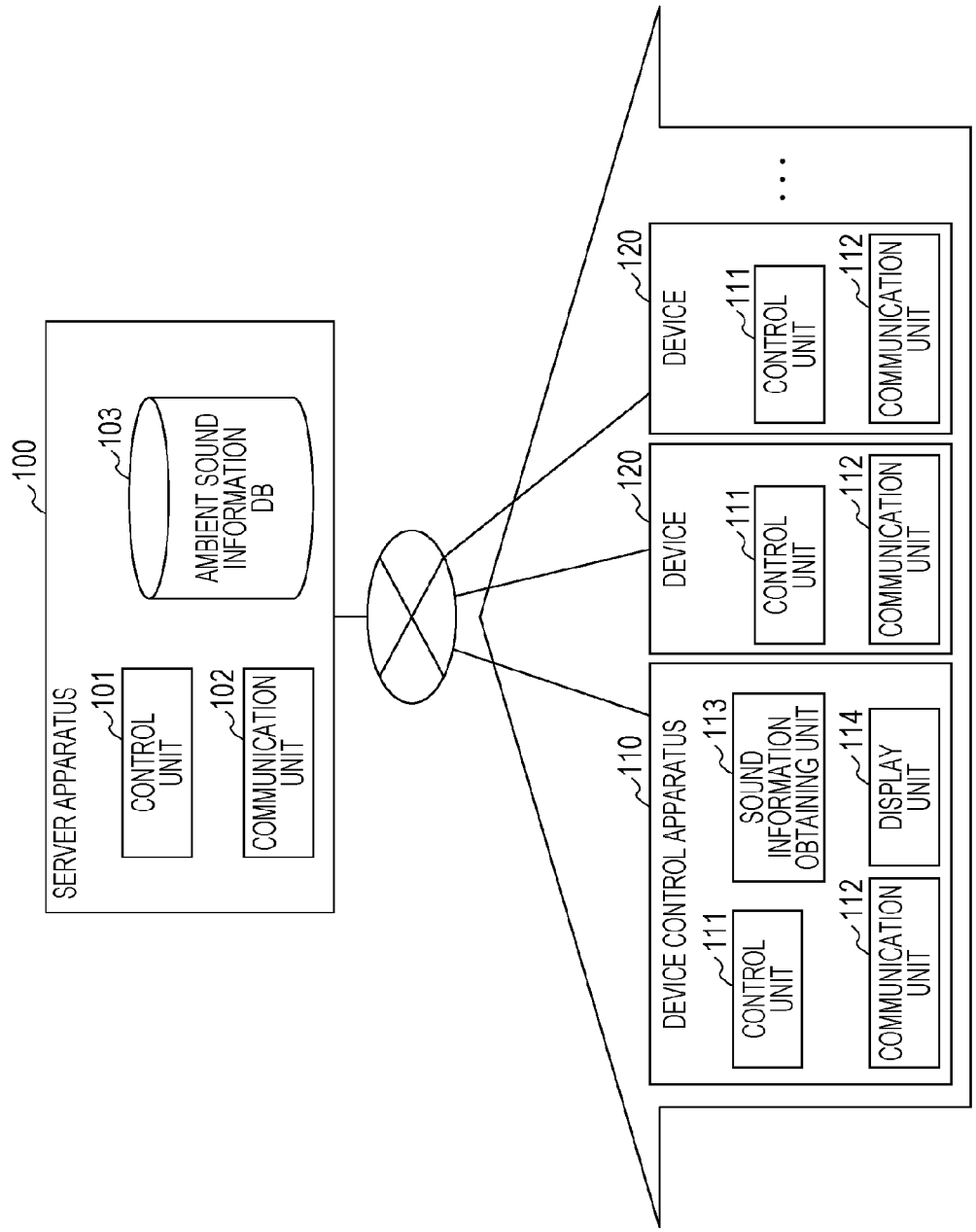
FIG. 1 is a diagram illustrating an overall configuration of a device control system according to a first embodiment of the present disclosure.

Underlying Knowledge Forming Basis of the Present Disclosure

When a device is controlled through speech recognition, a speech command might not be correctly recognized due to ambient sound (noise) emitted from other devices in a house. Therefore, noise needs to be removed during a speech input. In Japanese Unexamined Patent Application Publication No. 2002-182679, ambient sound is obtained by a microphone and a noise analysis is conducted in order to remove noise. In processing in steps S5 and S6 illustrated in FIG. 4 of Japanese Unexamined Patent Application Publication No. 2002-182679, it is detected whether stationary noise has significantly changed, and if the stationary noise has not significantly changed, the process for analyzing noise is not performed. Because the stationary noise significantly changes time after time, however, the process for analyzing noise needs to be performed constantly. For example, as described in Paragraph 0056 of Japanese Unexamined Patent Application Publication No. 2002-182679, the process for analyzing noise needs to be performed each time the air flow rate of an air conditioner is changed from low to high. Consequently, the amount of processing becomes large, and a problem arises that it takes time to establish a state in which a speech command can be received.

As a result of the above examination, the inventors have conceived aspects of the present disclosure.

A method for controlling a device according to an aspect of the present disclosure is a method for controlling a device used for controlling a plurality of devices provided in a house on the basis of a speech command from a user. The method includes the steps of obtaining ambient sound around the plurality of devices at a first time, obtaining operation states of the plurality of devices at the first time from the plurality of devices through a network, and storing, in a database, the operation states of the plurality of devices at the first time obtained in the step of obtaining the operation states of the plurality of devices at the first time and the ambient sound obtained at the first time in the step of obtaining the ambient sound while associating the operation states and the ambient sound with each other.

According to this configuration, the ambient sound around the plurality of devices is obtained at the first time. The operation states of the plurality of devices at the first time are obtained through the network. The obtained operation states at the first time and the ambient sound obtained at the first time are stored and associated with each other in the database.

Therefore, by obtaining, from the database, ambient sound corresponding to the operation states of the plurality of devices at a time when a speech command is input and removing noise included in the speech command on the basis of the obtained ambient sound, speech recognition can be performed more certainly without performing the process for analyzing noise too many times.

In addition, the method for controlling a device preferably further includes the steps of obtaining a speech command from the user at a second time, which is different from the first time, obtaining the operation states of the plurality of devices at the second time from the plurality of devices through the network, and removing, if the database stores operation states that match the operation states of the plurality of devices at the second time obtained in the step of obtaining the operation states of the plurality of devices at the second time, noise from the speech command on the basis of ambient sound stored and associated with the operation states in the database.

According to this configuration, the speech command from the user is obtained at the second time, which is different from the first time. The operation states of the plurality of devices at the second time are obtained through the network. If the database stores the operation states that match the obtained operation states of the plurality of devices at the second time, noise is removed from the speech command on the basis of the ambient sound stored and associated with the operation states in the database.

Therefore, noise (ambient sound) included in the speech command can be removed more certainly, thereby making it possible to perform speech recognition more certainly.

In addition, the method for controlling a device preferably further includes the steps of obtaining a speech command from the user at a second time, which is different from the first time, obtaining the operation states of the plurality of devices at the second time from the plurality of devices through the network, determining, if the database stores operation states that match the operation states of the plurality of devices at the second time obtained in the step of obtaining the operation states of the plurality of devices at the second time, whether it is possible to perform speech recognition in a sound environment estimated from ambient sound stored and associated with the operation states in the database, and notifying the user of a result of the determination made in the step of determining.

According to this configuration, the speech command from the user is obtained at the second time, which is different from the first time. The operation states of the plurality of devices at the second time are obtained through the network. If the database stores the operation states that match the obtained operation states of the plurality of devices at the second time, it is determined whether it is possible to perform speech recognition in the sound environment estimated from the ambient sound stored and associated with the operation states in the database. The user is notified of the result of the determination.

Therefore, if it is difficult to perform speech recognition due to an effect of the ambient sound, it is possible to prompt the user to change the operation states of the plurality of devices, thereby reducing the ambient sound that hinders speech recognition.

In addition, the method for controlling a device preferably further includes the steps of obtaining a speech command from the user at a second time, which is different from the first time, obtaining the operation states of the plurality of devices at the second time from the plurality of devices through the network, determining, if the database stores operation states that match the operation states of the plurality of devices at the second time obtained in the step of obtaining the operation states of the plurality of devices at the second time, whether it is possible to perform speech recognition in a sound environment estimated from ambient sound stored and associated with the operation states in the database, identifying, if it is determined in the step of determining that it is difficult to perform speech recognition, at least one of the plurality of devices that is emitting the ambient sound, and controlling the operation state of a certain device among the at least one of the plurality of devices that is emitting the ambient sound in order to establish a sound environment in which it is possible to perform speech recognition.

According to this configuration, the speech command from the user is obtained at the second time, which is different from the first time. The operation states of the plurality of devices at the second time are obtained through the network. If the database stores the operation states that match the obtained operation states of the plurality of devices at the second time, it is determined whether it is possible to perform speech recognition in the sound environment estimated from the ambient sound stored and associated with the operation states in the database. If it is determined that it is difficult to perform speech recognition, one of the plurality of devices that is emitting the ambient sound is controlled.

Therefore, since one of the plurality of devices that is emitting the ambient sound is controlled after it is determined that it is difficult to perform speech recognition, the ambient sound that hinders speech recognition can be reduced, thereby making it possible to perform speech recognition more certainly.

In addition, in the method for controlling a device, the database preferably also stores information indicating whether speech recognition was successful in past while associating the information with the operation states. If it is determined in the step of determining that it is difficult to perform speech recognition, the plurality of devices are preferably controlled in the step of controlling in such a way as to operate in operation states stored in the database in which speech recognition was successful in the past.

According to this configuration, since the plurality of devices are controlled after it is determined that it is difficult to perform speech recognition in such a way as to operate in the operation states stored in the database in which speech recognition was successful in the past, the plurality of devices can be controlled easily, thereby making it possible to perform speech recognition more certainly.

In addition, in the method for controlling a device, in the step of storing, the database preferably also stores the operation states of the plurality of devices at the first time obtained in the step of obtaining the operation states of the plurality of devices at the first time and volume of sound emitted by the plurality of devices while associating the operation states and the volume with each other. If it is determined in the step of determining that the database stores operation states that match the operation states of the plurality of devices at the second time obtained in the step of obtaining the operation states of the plurality of devices at the second time, it is preferably determined whether it is possible to perform speech recognition by determining whether volume of the ambient sound, which includes the sound emitted by the plurality of devices, associated with the operation states in the database is lower than or equal to a certain level at which it is possible to perform speech recognition.

According to this configuration, by determining whether the volume of the ambient sound stored and associated with the operation states in the database is lower than or equal to the certain level at which it is possible to perform speech recognition, whether it is possible to perform speech recognition can be determined easily.

In addition, the method for controlling a device preferably further includes the step of detecting whether the speech command has not been input for a certain period of time. If it is detected in the step of detecting that the speech command has not been input for the certain period of time, the ambient sound around the plurality of devices is preferably obtained in the step of obtaining the ambient sound.

According to this configuration, since unnecessary sound other than the speech command uttered by the user is obtained as the ambient sound, the ambient sound included in the speech command can be removed more certainly.

In addition, the method for controlling a device preferably further includes the step of detecting a person around the plurality of devices. If a person is not detected in the step of detecting a person, the ambient sound around the plurality of devices is preferably obtained in the step of obtaining the ambient sound.

According to this configuration, since unnecessary sound other than the speech command uttered by the user is obtained as the ambient sound, the ambient sound included in the speech command can be removed more certainly.

In addition, in the method for controlling a device, if the database does not store operation states that match the operation states of the plurality of devices at the first time obtained in the step of obtaining the operation sates of the plurality of devices at the first time, the ambient sound around the plurality of devices is preferably obtained in the step of obtaining the ambient sound.

According to this configuration, since the ambient sound around the plurality of devices is obtained if the database does not store the operation states that match the obtained operation states of the plurality of devices at the first time, a database in which the new operation states and ambient sound are associated with each other can be constructed.

A device control system according to another aspect of the present disclosure is a device control system that controls a plurality of devices on the basis of a speech command from a user. The device control system includes an ambient sound obtainer that obtains ambient sound around the plurality of devices at a first time, an operation state obtainer that obtains the operation states of the plurality of devices at the first time from the plurality of devices through a network, and a database manager that stores the operation states at the first time obtained by the operation state obtainer and the ambient sound obtained by the ambient sound obtainer at the first time in a database while associating the operation states and the ambient sound with each other.

According to this configuration, the ambient sound around the plurality of devices is obtained at the first time. The operation states of the plurality of devices are obtained through the network. The obtained operation states at the first time and the ambient sound obtained at the first time are associated with each other and stored in the database.

Therefore, by obtaining, from the database, ambient sound corresponding to the operation states of the plurality of devices when a speech command is input and removing noise included in the speech command on the basis of the obtained ambient sound, speech recognition can be performed more certainly without performing the process for analyzing noise too many times.

Embodiments of the present disclosure will be described hereinafter with reference to the accompanying drawings. The following embodiments are specific examples of the present disclosure and do not limit the technical scope of the present disclosure.

First Embodiment

Configurations of Apparatuses

FIG. 1 is a diagram illustrating an overall configuration of a device control system according to a first embodiment of the present disclosure. The configuration of the device control system illustrated in FIG. 1 is an example, and a component other than ones illustrated in FIG. 1 may be included. Part of the configuration of the device control system illustrated in FIG. 1 may be omitted.

The device control system includes a server apparatus 100, a device control apparatus 110, and devices 120. The devices 120 are devices that are provided in a house and that can be controlled through speech recognition, such as a television set and an air conditioner. As illustrated in FIG. 1, the server apparatus 100, the device control apparatus 110, and the devices 120 to be controlled are connected to one another through a network. A single device 120 or a plurality of devices 120 may be connected to the server apparatus 100. The devices 120 need not be directly connected to the server apparatus 100. The devices 120 may be connected to the device control apparatus 110 through, for example, a local area network (LAN) or may be connected to the server apparatus 100 through the device control apparatus 110.

A place where the server apparatus 100 is installed is not particularly limited. The server apparatus 100 may be arranged in a data center that handles big data and that is owned by a company that manages and operates the data center, or may be arranged in each house. In addition, components of the server apparatus 100 may be included in a single apparatus, or may be included in different apparatuses.

The server apparatus 100 includes a control unit 101, a communication unit 102, and an ambient sound information database (DB) 103.

The control unit 101 is any component configured to perform various types of control of the server apparatus 100. For example, the control unit 101 is configured by a central processing unit (CPU).

The communication unit 102 is any component configured to enable the server apparatus 100 to be connected to a network (for example, the Internet). The server apparatus 100 may be connected to the Internet using any method.

The ambient sound information database 103 is a recording device capable of accumulating a large amount of information. In the ambient sound information database 103, for example, operation states of the devices 120 in the house and ambient sound information are associated with each other. The ambient sound information database 103 may be included in a single apparatus, or may be included in different apparatuses.

The device control apparatus 110 includes a control unit 111, a communication unit 112, a sound information obtaining unit 113, and a display unit 114. These components of the device control apparatus 110 may be included in the device control apparatus 110 as part of the device control apparatus 110, or may be external devices connected to the device control apparatus 110. Here, the device control apparatus 110 may be, for example, a monitor of a television for domestic use, a personal computer (PC), or the like, insofar as the above-mentioned components are included. Alternatively, the device control apparatus 110 may be an apparatus dedicated to the device control system.

The configurations of the control unit 111 and the communication unit 112 are the same as those of the control unit 101 and the communication unit 102, respectively, of the server apparatus 100, and accordingly description thereof is omitted.

The sound information obtaining unit 113 is a recording device including a microphone. The display unit 114 is a device having a display function such as a monitor.

Each device 120 includes a control unit 111 and a communication unit 112. These components of each device 120 may be included in each device 120 as part of each device 120, or may be external devices connected to each device 120.

The configurations of the control unit 111 and the communication unit 112 are the same as those of the control unit 101 and the communication unit 102, respectively, of the server apparatus 100, and accordingly description thereof is omitted.

Although the device control system, which will be described hereinafter, includes the server apparatus 100, the device control apparatus 110, and the devices 120 in FIG. 1, the configuration of the device control system is not limited to this. For example, part or the entirety of the configurations of the server apparatus 100 and the device control apparatus 110 may be included in the devices 120, and the device control system may include only the devices 120.

The embodiments that will be described hereinafter are specific examples of the present disclosure. Values, shapes, components, steps, order of the steps, and the like mentioned in the following embodiments are examples and not intended to limit the present disclosure. Among the components that will be mentioned in the following embodiments, components that are not described in independent claims, which define broadest concepts, are described as arbitrary components. In addition, different embodiments may be combined with each other.

Configuration of Device Control System

Figure 2:
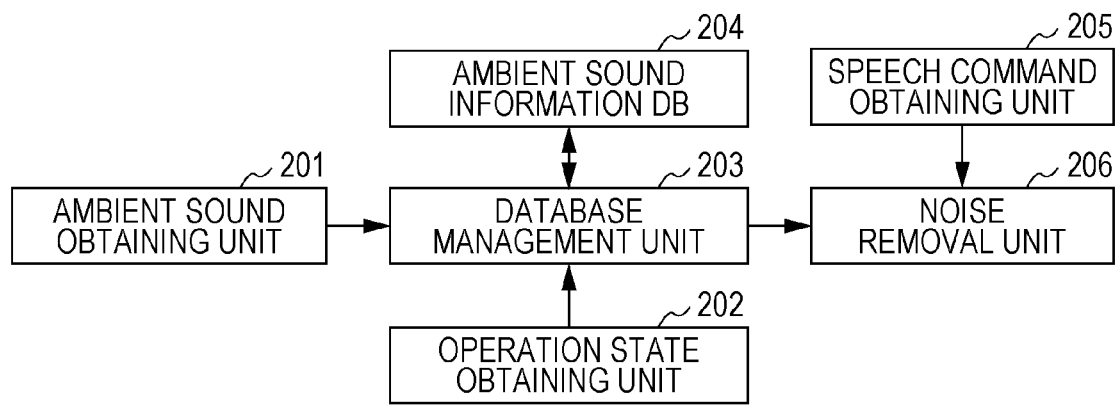
FIG. 2 is a block diagram illustrating the configuration of the device control system according to the first embodiment of the present disclosure.

FIG. 2 is a block diagram illustrating the configuration of the device control system according to the first embodiment of the present disclosure.

The device control system according to the first embodiment includes an ambient sound obtaining unit 201, an operation state obtaining unit 202, a database management unit 203, an ambient sound information database 204, a speech command obtaining unit 205, and a noise removal unit 206.

The ambient sound obtaining unit 201 obtains ambient sound information indicating ambient sound around the plurality of devices 120. Here, the ambient sound information may indicate sound including operating noise emitted by the devices 120 and other types of noise in the house. If the ambient sound includes abrupt sounds in addition to stationary ambient sound, the ambient sound obtaining unit 201 may have a function of removing the abrupt sounds. A timing at which the ambient sound obtaining unit 201 obtains ambient sound and the temporal length of the ambient sound obtained by the ambient sound obtaining unit 201 are not particularly limited. The ambient sound obtaining unit 201 may constantly obtain ambient sound, or may obtain ambient sound at predetermined time intervals. Alternatively, the ambient sound obtaining unit 201 may obtain ambient sound only while a person is not speaking. The ambient sound obtaining unit 201 outputs the obtained ambient sound information to the database management unit 203.

The operation state obtaining unit 202 obtains operation state information indicating the operation state of each device connected through the network when the ambient sound obtaining unit 201 obtains ambient sound. Here, the operation state information is, for example, an on/off state of a power supply, an operation mode, or the like. The operation state information may include other pieces of information that can be obtained from each device. The operation state obtaining unit 202 outputs the obtained operation state information to the database management unit 203.

The database management unit 203 constructs and manages the ambient sound information database 204 using the ambient sound information obtained by the ambient sound obtaining unit 201 and the operation state information obtained by the operation state obtaining unit 202. In the ambient sound information database 204, ambient sound information obtained in the past and operation state information at a time when the ambient sound information has been obtained are associated with each other. The database management unit 203 stores operation state information at a first time obtained by the operation state obtaining unit 202 and ambient sound information obtained by the ambient sound obtaining unit 201 at the first time in the ambient sound information database 204 while associating the operation state information and the ambient sound information with each other.

Here, the obtained ambient sound information is registered as a waveform audio file format (WAV) file. The ambient sound information need not necessarily be a WAV file. For example, the ambient sound information may be data subjected to speech compression, such as a Moving Picture Experts Group (MPEG) file or an audio interchange file format (AIFF) file. The ambient sound information may be a feature quantity that is calculated from ambient sound and that is necessary to remove noise. The feature quantity necessary to remove noise is, for example, a frequency spectrum or the like. The feature quantity necessary to remove noise and a method for removing noise are not particularly limited.

The database management unit 203 outputs the ambient sound information and the operation state information stored in the ambient sound information database 204 to the noise removal unit 206.

The speech command obtaining unit 205 obtains a speech command from a user at a timing different from when the ambient sound obtaining unit 201 obtains ambient sound information. The speech command refers to a voice uttered by a user in order to operate a device. When the speech command obtaining unit 205 obtains a speech command, the operation state obtaining unit 202 obtains the operation state information regarding the plurality of devices 120 through the network.

The noise removal unit 206 refers to the operation state information regarding the plurality of devices 120 obtained when a speech command for controlling a device has been input and the ambient sound information stored in the constructed ambient sound information database 204 in order to remove noise from the speech command. That is, if the ambient sound information database 204 stores operation states that match the operation states of the plurality of devices 120 obtained by the operation state obtaining unit 202 when the speech command has been obtained, the noise removal unit 206 removes noise from the speech command on the basis of ambient sound stored and associated with the operation state information in the ambient sound information database 204. Here, the method for removing noise is not particularly limited. The noise removal unit 206 may calculate a sound for canceling noise on the basis of the ambient sound information and play back the sound, or may remove noise from the obtained speech command through signal processing.

The ambient sound obtaining unit 201 is realized by the sound information obtaining unit 113, the communication unit 112, and the communication unit 102 illustrated in FIG. 1. The operation state obtaining unit 202 is realized by the communication unit 112 and the communication unit 102 illustrated in FIG. 1. The database management unit 203 is realized by the control unit 101 illustrated in FIG. 1. The ambient sound information database 204 is realized by the ambient sound information database 103 illustrated in FIG. 1. The speech command obtaining unit 205 is realized by the sound information obtaining unit 113, the communication unit 112, and the communication unit 102 illustrated in FIG. 1. The noise removal unit 206 is realized by the control unit 101 illustrated in FIG. 1.

Operation of Device Control System

Figure 3:
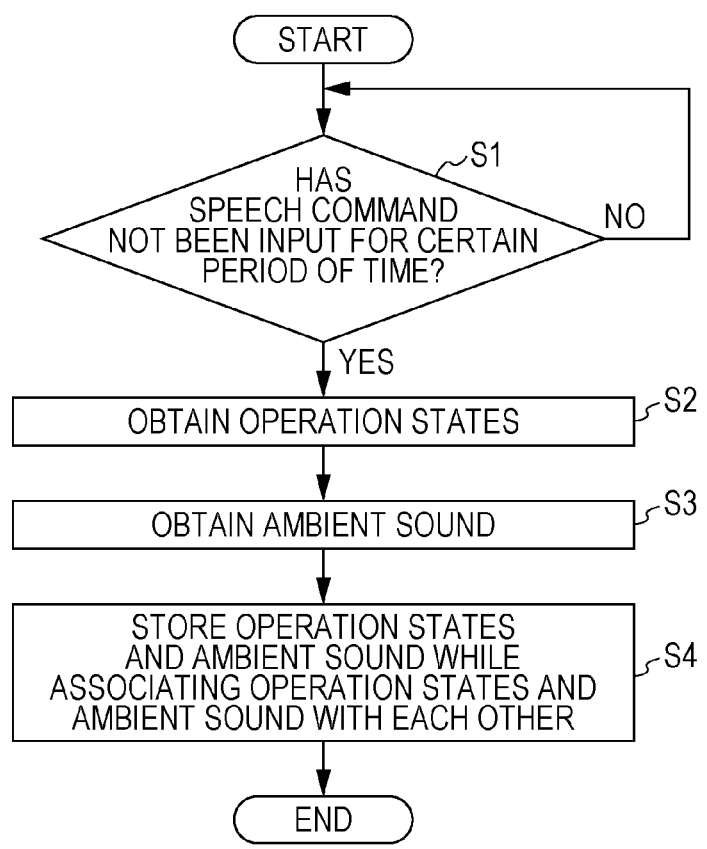
FIG. 3 is a flowchart illustrating a process for constructing an ambient sound information database performed in the device control system according to the first embodiment of the present disclosure.

FIG. 3 is a flowchart illustrating a process for constructing the ambient sound information database 204 performed in the device control system according to the first embodiment of the present disclosure.

A method for obtaining ambient sound to be accumulated in the ambient sound information database 204 used in the device control system according to the first embodiment will be described with reference to FIG. 3. A process illustrated in the flowchart is continuously performed.

In view of an object of the device control system according to the first embodiment, it is desirable that ambient sound accumulated in the ambient sound information database 204 not include voices for controlling the devices 120. Therefore, a speech detection unit (not illustrated) determines whether a speech command has not been input for a certain period of time.

First, the speech detection unit determines whether a speech command has not been input for the certain period of time (step S1). The speech detection unit measures time until a speech command is obtained after a previous speech command is obtained and determines whether the certain period of time has elapsed since the previous speech command was obtained. If the speech detection unit determines that a speech command has not been input for the certain period of time (YES in step S1), the process proceeds to processing in step S2. On the other hand, if the speech detection unit determines that a speech command has been input within the certain period of time (NO in step S1), the processing in step S1 is repeatedly performed.

If the speech detection unit determines that a speech command has not been input for the certain period of time, the operation state obtaining unit 202 obtains the operation states of the plurality of devices 120 (step S2).

Next, the ambient sound obtaining unit 201 obtains ambient sound (step S3). Thus, if the speech detection unit determines that a speech command has not been input for the certain period of time, the ambient sound obtaining unit 201 obtains ambient sound around the plurality of devices 120. By sequentially performing the process for obtaining the operation states of the plurality of devices 120 using the operation state obtaining unit 202 and the process for obtaining ambient sound using the ambient sound obtaining unit 201, the operation states and ambient sound can be obtained substantially simultaneously. Alternatively, the operation state obtaining unit 202 and the ambient sound obtaining unit 201 may obtain the operation states and ambient sound, respectively, at the same time.

Next, the database management unit 203 stores the operation states of the plurality of devices 120 obtained by the operation state obtaining unit 202 and the ambient sound obtained by the ambient sound obtaining unit 201 in the ambient sound information database 204 while associating the operation states and the ambient sound with each other (step S4).

FIG. 4 is a diagram illustrating a data structure of the ambient sound information database 204. For example, if Device A, Device B, and Device C are connected to a network, an ambient sound pattern is associated with each combination of on/off state information regarding Device A and Device B and an operation mode (high or low air flow rate) of Device C as illustrated in FIG. 4.

For example, if the speech detection unit determines that a speech command has not been input for the certain period of time, the operation state obtaining unit 202 obtains operation state information indicating Device A is turned on from Device A, operation state information indicating Device B is turned on from Device B, and operation state information indicating the operation mode of Device C is high from Device C. At this time, the ambient sound obtaining unit 201 obtains ambient sound and outputs the obtained ambient sound to the database management unit 203 as ambient sound information "XXX01.wav", which is a WAV format file. The database management unit 203 stores the operation state information regarding Devices A, B, and C obtained by the operation state obtaining unit 202 and the ambient sound information obtained by the ambient sound obtaining unit 201 in the ambient sound information database 204 while associating the operation state information and the ambient sound information with each other.

Although presence or absence of a person is detected by determining whether a speech command has not been input for the certain period of time in the first embodiment, the present disclosure is not particularly limited to this. Presence or absence of a person may be determined by a sensor such as a human detection sensor, instead.

Figure 5:
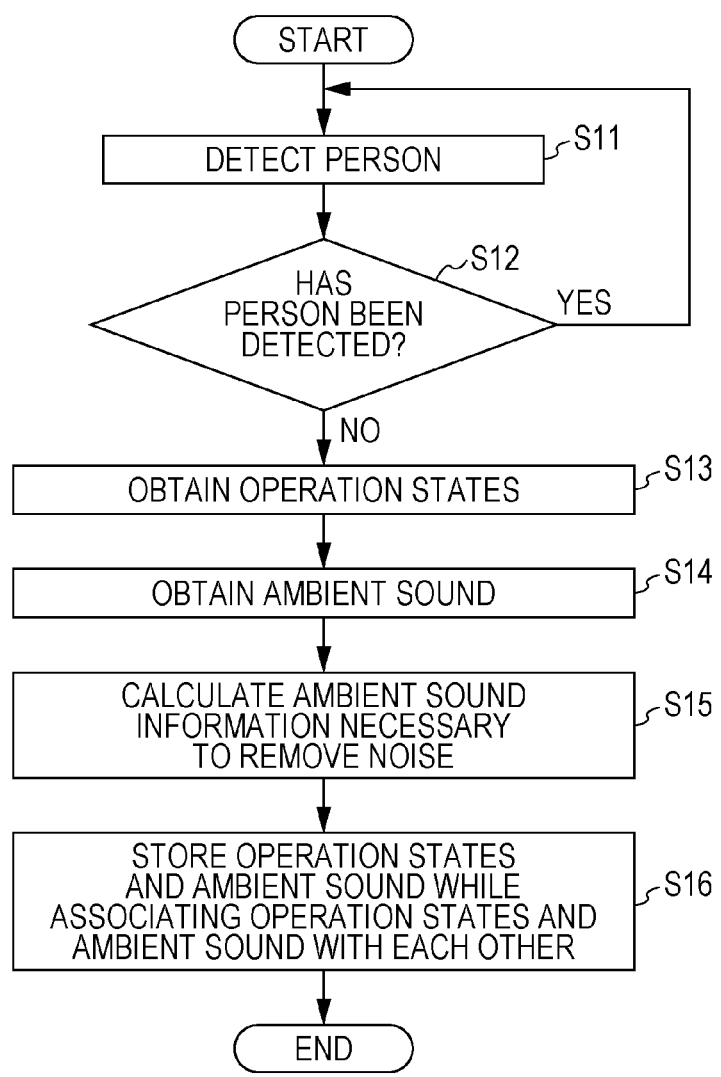
FIG. 5 is a flowchart illustrating a process for constructing the ambient sound information database performed in the device control system according to a first modification of the first embodiment of the present disclosure.

FIG. 5 is a flowchart illustrating a process for constructing the ambient sound information database 204 performed in the device control system according to a first modification of the first embodiment of the present disclosure.

A method for obtaining ambient sound to be accumulated in the ambient sound information database 204 used in the device control system according to the first modification of the first embodiment will be described with reference to FIG. 5. The process illustrated in the flowchart is continuously performed.

First, a human detection sensor (not illustrated) detects a person around the plurality of devices 120 (step S11). Here, the human detection sensor may be any sensor that detects a person using, for example, infrared radiation, ultrasonic waves, visible light, or the like.

Next, it is determined whether the human detection sensor detects a person. Here, if the human detection sensor detects a person (NO in step S12), the process proceeds to processing in step S13. On the other hand, if the human detection sensor detects a person (YES in step S12), the processing in steps S11 and S12 is repeatedly performed.

If the human detection sensor does not detect a person, the operation state obtaining unit 202 obtains the operation states of the plurality of devices 120 (step S13).

Next, the ambient sound obtaining unit 201 obtains ambient sound (step S14). Thus, if the human detection sensor does not detect a person, ambient sound around the plurality of devices 120 is obtained.

Next, the ambient sound obtaining unit 201 calculates, from the obtained ambient sound, ambient sound information necessary to remove noise (step S15). After obtaining ambient sound in step S14, the ambient sound obtaining unit 201 calculates, from the obtained ambient sound, a feature quantity necessary to remove noise as ambient sound information.

Next, the database management unit 203 stores the operation states of the plurality of devices 120 obtained by the operation state obtaining unit 202 and the ambient sound information obtained by the ambient sound obtaining unit 201 in the ambient sound information database 204 while associating the operation states and the ambient sound information with each other (step S16).

In the operation of the device control system illustrated in FIG. 5, the processing in step S15 may be omitted. The ambient sound obtaining unit 201 may output the ambient sound obtained in step S14 to the database management unit 203 as ambient sound information, instead.

Although ambient sound is obtained after operation states are obtained in FIGS. 3 and 5, the present disclosure is not particularly limited to this. Operation states may be obtained after ambient sound is obtained, instead. Alternatively, the operation state obtaining unit 202 may regularly obtain operation states and store times when the operation states have been obtained and the operation states while associating the times and the operation states with each other. The database management unit 203 may then read, from the operation state obtaining unit 202, operation states corresponding to a time when ambient sound has been obtained by the ambient sound obtaining unit 201 and store the read operation states and the ambient sound in the ambient sound information database 204 while associating the operation states and the ambient sound with each other.

In the first embodiment, if the ambient sound information database 204 already exists, ambient sound may be obtained only when operation states that are not stored in the ambient sound information database 204.

Figure 6:
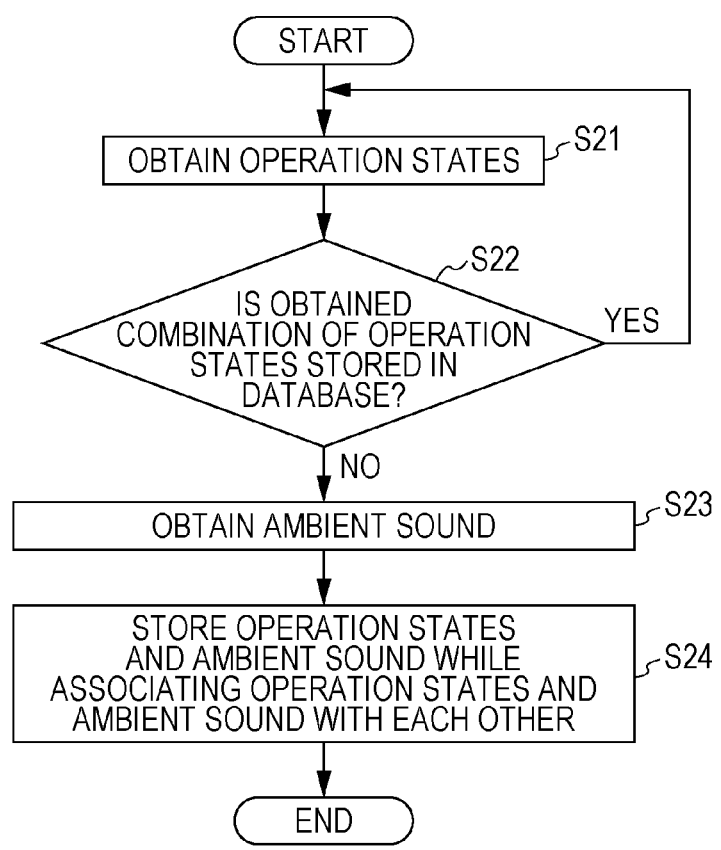
FIG. 6 is a flowchart illustrating a process for constructing the ambient sound information database performed in the device control system according to a second modification of the first embodiment of the present disclosure.

FIG. 6 is a flowchart illustrating a process for constructing the ambient sound information database 204 performed in the device control system according to a second modification of the first embodiment of the present disclosure.

A method for obtaining ambient sound to be accumulated in the ambient sound information database 204 used in the device control system according to the second modification of the first embodiment will be described. The process illustrated in the flowchart is continuously performed.

First, the operation state obtaining unit 202 obtains the operation states of the plurality of devices 120 (step S21).

Next, the database management unit 203 determines whether the combination of operation states of the plurality of devices 120 obtained by the operation state obtaining unit 202 is stored in the ambient sound information database 204 (step S22). Here, if the database management unit 203 determines that the combination of operation states is not stored in the ambient sound information database 204 (NO in step S22), the process proceeds to processing in step S23. On the other hand, if the database management unit 203 determines that the combination of operation states is stored in the ambient sound information database 204 (YES in step S22), the processing in steps S21 and S22 is repeatedly performed.

Next, the ambient sound obtaining unit 201 obtains ambient sound (step S23). If operation states that match the operation states of the plurality of devices 120 obtained by the operation state obtaining unit 202 at a first time are not stored in the ambient sound information database 204, the ambient sound obtaining unit 201 obtains ambient sound around the plurality of devices 120.

Next, the database management unit 203 stores the operation states of the plurality of devices 120 obtained by the operation state obtaining unit 202 and the ambient sound obtained by the ambient sound obtaining unit 201 in the ambient sound information database 204 while associating the operation states and the ambient sound with each other (step S24).

It is only sufficient that the timing at which ambient sound is obtained satisfies one of the conditions illustrated in the flowcharts of FIGS. 3, 5, and 6. The timing at which ambient sound is obtained may satisfy all the conditions illustrated in the flowcharts of FIGS. 3, 5, and 6.

Alternatively, even if the operation states of the plurality of devices 120 are obtained in FIG. 6, the ambient sound obtaining unit 201 may calculate a feature quantity from ambient sound just as when the operation states of the plurality of devices 120 are not obtained in FIG. 5.

Next, a process for removing noise performed in the device control system according to the first embodiment will be described with reference to FIG. 7.

Figure 7:
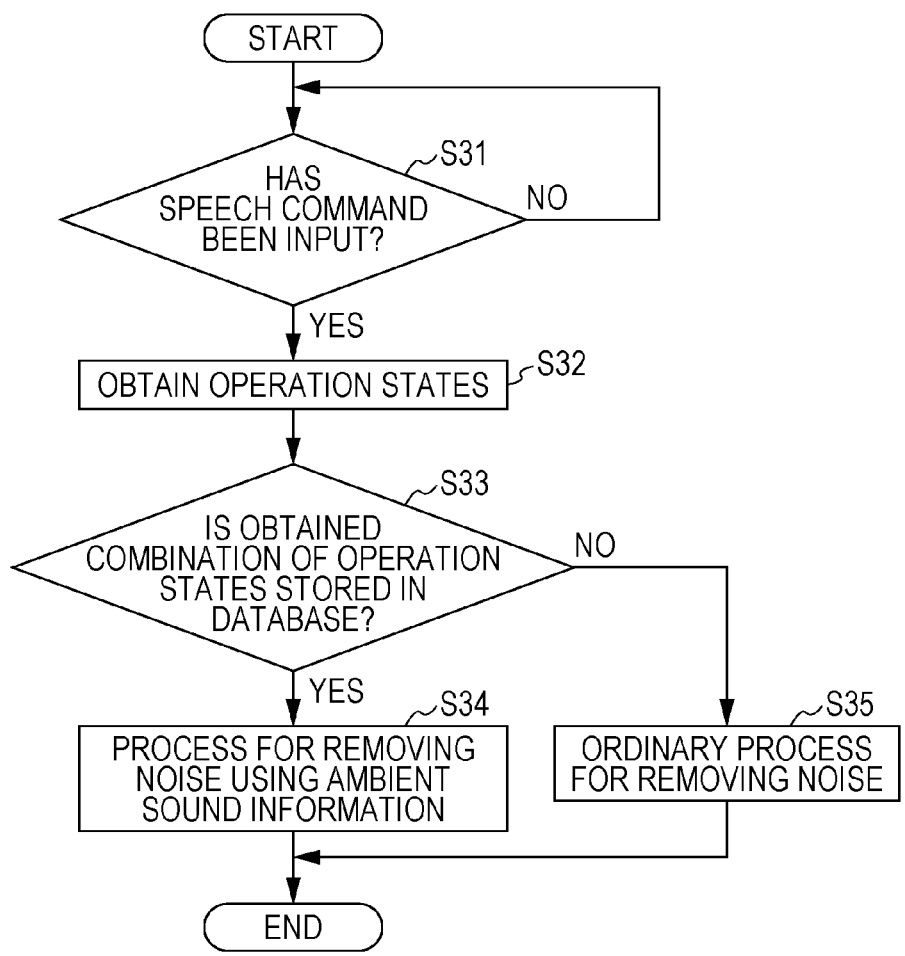
FIG. 7 is a flowchart illustrating a process for removing noise performed in the device control system according to the first embodiment of the present disclosure.

FIG. 7 is a flowchart illustrating the process for removing noise performed in the device control system according to the first embodiment of the present disclosure.

First, the speech command obtaining unit 205 receives a speech command uttered by the user and determines whether a speech command has been input (step S31).

Next, the operation state obtaining unit 202 obtains the operation states of the plurality of devices 120 (step S32).

Next, the database management unit 203 determines whether the combination of operation states of the plurality of devices 120 obtained by the operation state obtaining unit 202 is stored in the ambient sound information database 204 (step S33). Here, if the database management unit 203 determines that the combination of operation states is stored in the ambient sound information database 204 (YES in S33), the noise removal unit 206 removes ambient sound (noise) from the obtained speech sound using ambient sound information corresponding to the obtained combination of operation states stored in the ambient sound information database 204 (step S34).

On the other hand, if the database management unit 203 determines that the combination of operation states is not stored in the ambient sound information database 204 (NO in step S33), the noise removal unit 206 performs an ordinary process for removing noise on the obtained speech command to remove ambient sound (noise) from the obtained speech command (step S35). The ordinary process for removing noise may be, for example, spectral subtraction, cepstral averaging, echo cancellation after estimating a sound source, or the like.

Thereafter, speech recognition is performed on the speech command from which noise has been removed by the noise removal unit 206, and one of the devices 120 is controlled in accordance with the speech command.

Thus, in the first embodiment, if operation states that match obtained operation states of the plurality of devices 120 are stored in the ambient sound information database 204, noise is removed from a speech command on the basis of ambient sound stored and associated with the operation states in the ambient sound information database 204. Therefore, noise (ambient sound) can be removed from a speech command more certainly, and speech recognition can be performed more certainly.

In the first embodiment, the operation states of all the devices 120 in the house and ambient sound may be stored and associated with each other in the ambient sound information database 204. The ambient sound information database 204 may be provided for each room in which a microphone for obtaining ambient sound and speech commands is provided. In this case, the operation states of a plurality of devices 120 arranged in each room and ambient sound may be stored and associated with each other in the ambient sound information database 204.

The process for removing noise illustrated in FIG. 7 may be performed using the ambient sound information database 204 provided for a room in which a microphone that has received a speech command is provided. If it is determined after the process for removing noise that it is difficult to perform speech recognition, the process for removing noise may be performed using the ambient sound information database 204 provided for an adjacent room.

Second Embodiment

Although noise (ambient sound) is removed from a speech command in the first embodiment, noise (ambient sound) is reduced by controlling a device that is acting as a noise source in a second embodiment.

Figure 8:
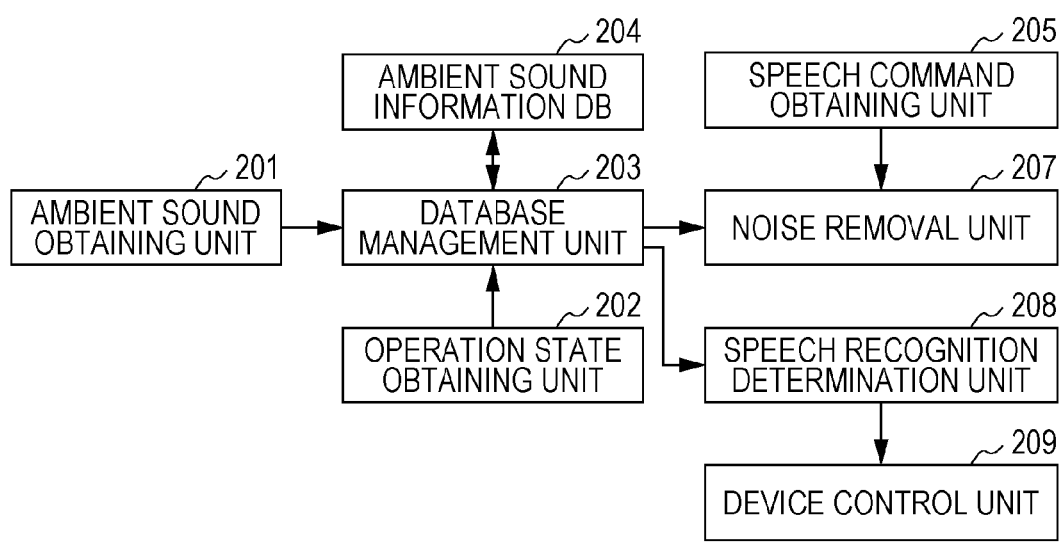
FIG. 8 is a block diagram illustrating the configuration of a device control system according to a second embodiment of the present disclosure.

FIG. 8 is a block diagram illustrating the configuration of a device control system according to the second embodiment of the present disclosure.

The device control system according to the second embodiment includes an ambient sound obtaining unit 201, an operation state obtaining unit 202, a database management unit 203, an ambient sound information database 204, a speech command obtaining unit 205, a noise removal unit 207, a speech recognition determination unit 208, and a device control unit 209. In the second embodiment, the same components as those of the device control system according to the first embodiment are given the same reference numerals, and description thereof is omitted.

The noise removal unit 207 performs the ordinary process for removing noise on a speech command obtained by the speech command obtaining unit 205. If it is determined that a combination of operation states is not stored in the ambient sound information database 204, the noise removal unit 207 performs the ordinary process for removing noise on the obtained speech command to remove ambient sound (noise) from the obtained speech command.

If operation states that match operation states of the plurality of devices 120 obtained by the operation state obtaining unit 202 at a second time are stored in the ambient sound information database 204, the speech recognition determination unit 208 determines whether it is possible to perform speech recognition in a sound environment estimated from ambient sound stored and associated with the operation states in the ambient sound information database 204.

Here, when obtaining ambient sound, the ambient sound obtaining unit 201 also obtains the volume of the ambient sound. The ambient sound information database 204 stores not only ambient sound but also the volume of the ambient sound. If the operation states that match the operation states of the plurality of devices 120 obtained by the operation state obtaining unit 202 at the second time are stored in the ambient sound information database 204, the speech recognition determination unit 208 determines whether it is possible to perform speech recognition by determining whether the volume of the ambient sound stored and associated with the operation states in the ambient sound information database 204 is lower than or equal to a certain level at which speech recognition can be performed. If the volume of the ambient sound stored and associated with the operation states in the ambient sound information database 204 is lower than or equal to the certain level, the ambient sound obtaining unit 201 determines that it is possible to perform speech recognition. On the other hand, if the volume of the ambient sound stored and associated with the operation states in the ambient sound information database 204 is higher than the certain level, the ambient sound obtaining unit 201 determines that it is difficult to perform speech recognition.

If the speech recognition determination unit 208 determines that it is difficult to perform speech recognition, the device control unit 209 controls one of the plurality of devices 120 that is emitting the ambient sound. For example, if the speech recognition determination unit 208 determines that it is difficult to perform speech recognition, the device control unit 209 may control, among the plurality of devices 120, a device 120 that is emitting sound whose volume is higher than a certain level. Alternatively, for example, if the speech recognition determination unit 208 determines that it is difficult to perform speech recognition, the device control unit 209 may turn off, among the plurality of devices 120, a device 120 that is turned on. Alternatively, if the speech recognition determination unit 208 determines that it is difficult to perform speech recognition, the device control unit 209 may control a plurality of devices 120 such that the plurality of devices 120 operate in accordance with a combination of operation states corresponding to smallest ambient sound.

The ambient sound information database 204 may store information indicating whether speech recognition was successful in the past while associating the information with combinations of operation states. If the speech recognition determination unit 208 determines that it is difficult to perform speech recognition, the device control unit 209 may control a plurality of devices 120 such that the plurality of devices 120 operate in accordance with a combination of operation states with which speech recognition was successful in the past. If the ambient sound information database 204 stores the information indicating whether speech recognition was successful in the past while associating the information with the combinations of operation states, the speech recognition determination unit 208 may determine whether it is possible to perform speech recognition on the basis of information indicating whether speech recognition was successful in the past associated with a combination of operation states of the plurality of devices 120 obtained by the operation state obtaining unit 202.

The noise removal unit 207 is realized by the control unit 101 illustrated in FIG. 1. The speech recognition determination unit 208 is realized by the control unit 101 illustrated in FIG. 1. The device control unit 209 is realized by the control unit 101 illustrated in FIG. 1.

A process for constructing the ambient sound information database 204 performed in the device control system according to the second embodiment of the present disclosure is the same as that according to the first embodiment illustrated in FIG. 3, 5, or 6, and accordingly description thereof is omitted.

Next, a process for controlling a device performed in the device control system according to the second embodiment will be described with reference to FIG. 9.

Figure 9:
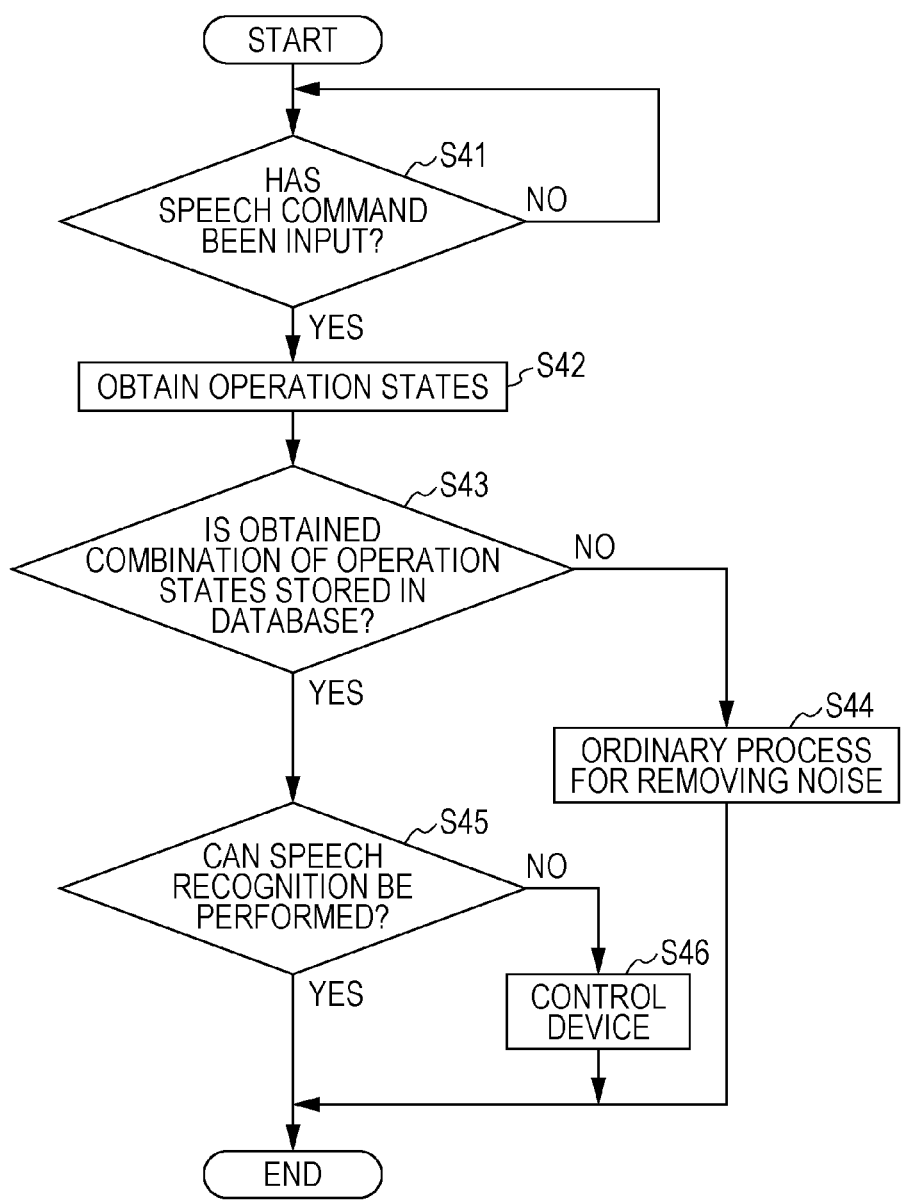
FIG. 9 is a flowchart illustrating a process for controlling a device performed in the device control system according to the second embodiment of the present disclosure.

FIG. 9 is a flowchart illustrating the process for controlling a device performed in the device control system according to the second embodiment of the present disclosure.

Processing in steps S41 to S43 illustrated in FIG. 9 is the same as that in steps S31 to S33 illustrated in FIG. 7, and accordingly description thereof is omitted.

If the database management unit 203 determines that a combination of operation states is not stored in the ambient sound information database 204 (NO in step S43), the noise removal unit 207 performs the ordinary process for removing noise on an obtained speech command to remove ambient sound (noise) from the obtained speech command (step S44).

On the other hand, if the database management unit 203 determines that the combination of operation states is stored in the ambient sound information database 204 (YES in step S43), the speech recognition determination unit 208 determines whether it is possible to perform speech recognition in a sound environment estimated from ambient sound stored and associated with the combination of operation states in the ambient sound information database 204 (step S45). Here, if the speech recognition determination unit 208 determines that it is possible to perform speech recognition (YES in step S45), the process ends.

On the other hand, if the speech recognition determination unit 208 determines that it is difficult to perform speech recognition (NO in step S45), the device control unit 209 controls one of the plurality of devices 120 that is emitting the ambient sound (step S46). In order to make it possible to control one of the devices 120 using a speech command, the device control unit 209 controls, on the basis of the information stored in the ambient sound information database 204, the device 120 that is emitting noise that hinders speech recognition. For example, if ambient sound information obtained when Device A is turned on includes noise that is suitable for speech recognition, the device control unit 209 temporarily turns off Device A while a speech command is being input.

Thereafter, speech recognition is performed on a speech command for which noise has been reduced, in order to control the device in accordance with the speech command.

If the server apparatus 100 and a display apparatus (a television set, a smartphone, a tablet computer, a PC, or the like) are connected to each other through a network in this device control system, the display apparatus may be notified that the device control unit 209 is controlling a device.

Figure 10:
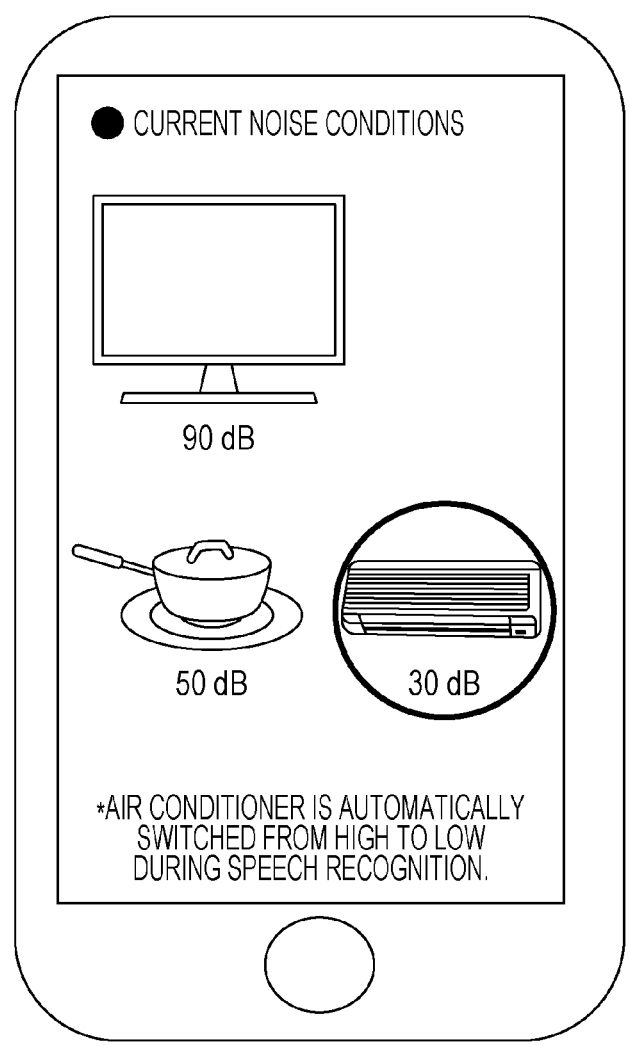
FIG. 10 is a diagram illustrating an example of a display screen displayed on a display apparatus when a device is controlled in order to make it possible to perform speech recognition.

FIG. 10 is a diagram illustrating an example of a display screen displayed on the display apparatus when a device is controlled in order to make it possible to perform speech recognition.

As illustrated in FIG. 10, the display screen includes images indicating a plurality of devices in operation and noise values (sound volume) of the plurality of devices. The database management unit 203 calculates the noise values of the plurality of devices from ambient sound obtained by the ambient sound obtaining unit 201. The noise values of the plurality of devices may be stored in advance while being associated with operation states of the plurality of devices. The display screen also includes information indicating the name of a device to be controlled during speech recognition and how the device is controlled. For example, in the display screen illustrated in FIG. 10, information indicating that the operation state of an air conditioner is changed from high to low is displayed.

Thus, in the second embodiment, if it is determined that it is difficult to perform speech recognition, one of a plurality of devices that is emitting ambient sound is controlled. Therefore, noise (ambient sound) that hinders speech recognition can be reduced, thereby making it possible to perform speech recognition more certainly. In addition, since the user is notified that a certain device is automatically controlled during speech recognition, the user feels less uncomfortable.

Third Embodiment

Although noise (ambient sound) is reduced by controlling a device that is acting as a noise source in the second embodiment, the user is notified of presence of a device acting as a noise source in a third embodiment.

Figure 11:
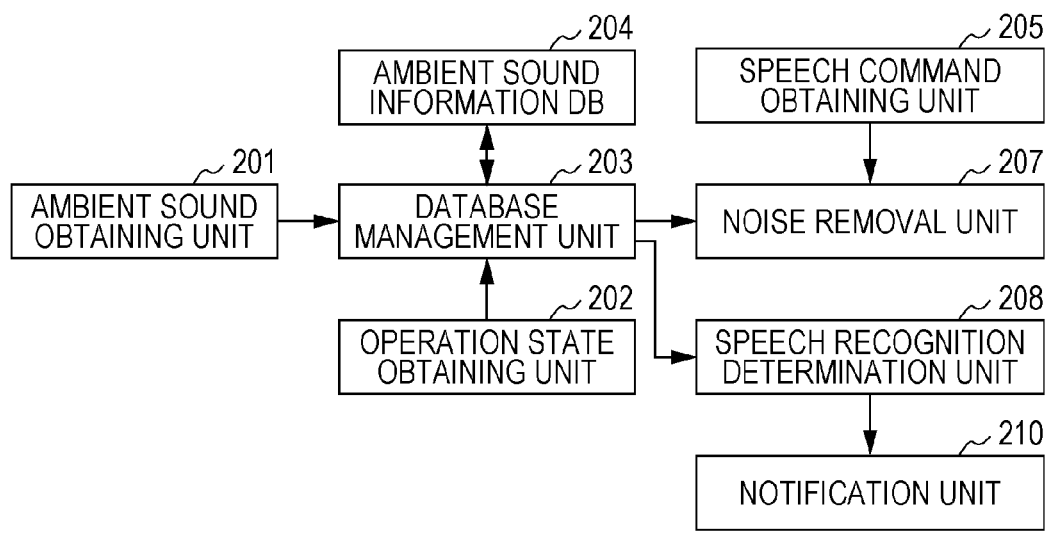
FIG. 11 is a block diagram illustrating the configuration of a device control system according to a third embodiment of the present disclosure.

FIG. 11 is a block diagram illustrating the configuration of a device control system according to the third embodiment of the present disclosure.

The device control system according to the third embodiment includes an ambient sound obtaining unit 201, an operation state obtaining unit 202, a database management unit 203, an ambient sound information database 204, a speech command obtaining unit 205, a noise removal unit 207, a speech recognition determination unit 208, and a notification unit 210. In the third embodiment, the same components as those of the device control system according to the first embodiment or the second embodiment are given the same reference numerals, and description thereof is omitted.

The notification unit 210 notifies the user of a result of a determination made by the speech recognition determination unit 208. If the speech recognition determination unit 208 determines that it is difficult to perform speech recognition, the notification unit 210 notifies the user that it is difficult to perform speech recognition. If the speech recognition determination unit 208 determines that it is difficult to perform speech recognition, the notification unit 210 transmits a display screen indicating that it is difficult to perform speech recognition to a display apparatus. The display apparatus displays the received display screen. The display apparatus may be, for example, a television set, a smartphone, a tablet computer, a PC, or the like.

The notification unit 210 is realized by the control unit 101 illustrated in FIG. 1.

A process for constructing the ambient sound information database 204 performed in the device control system according to the third embodiment of the present disclosure is the same as that according to the first embodiment illustrated in FIG. 3, 5, or 6, and accordingly description thereof is omitted.

Next, a process for displaying information performed in the device control system according to the third embodiment will be described with reference to FIG. 12.

Figure 12:
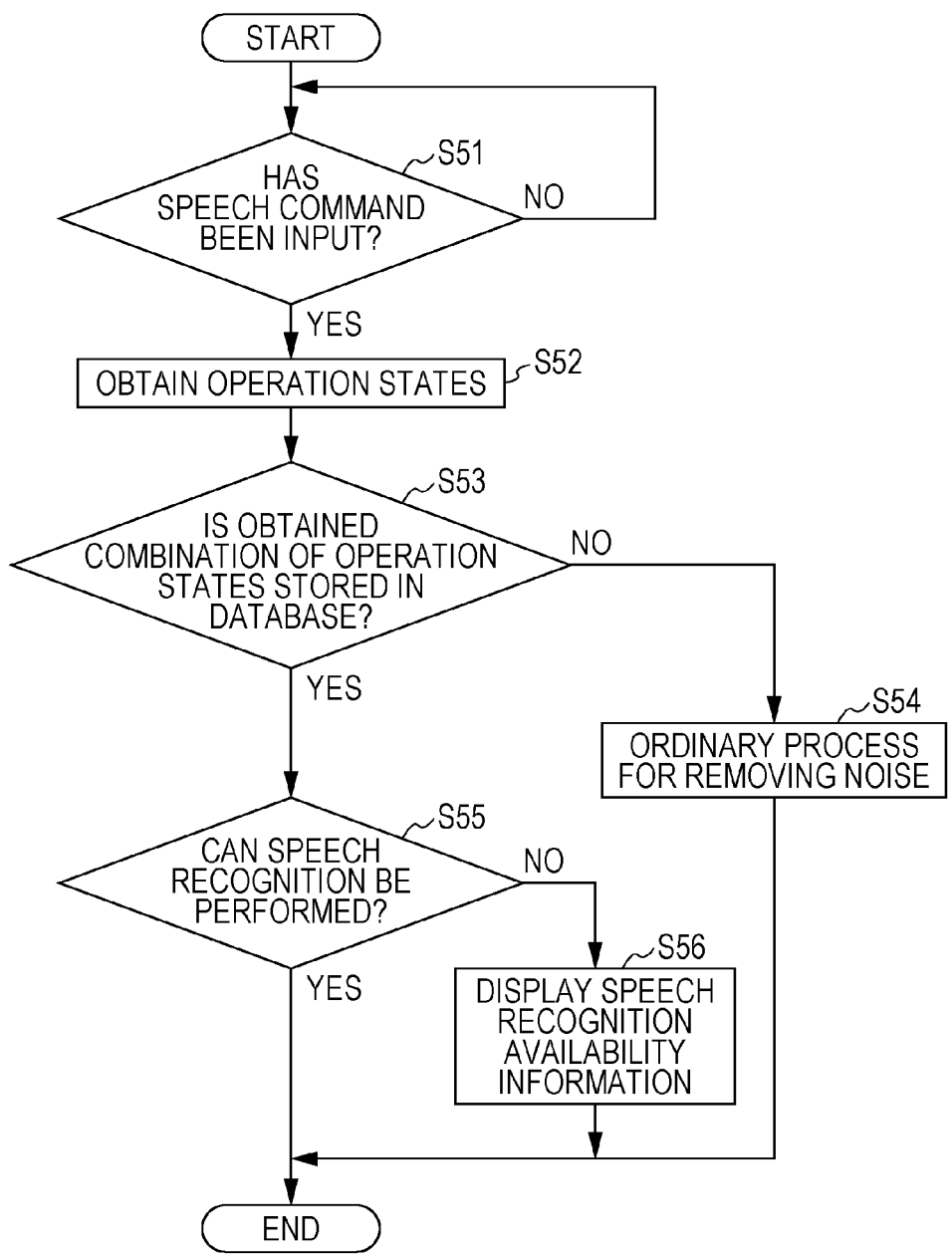
FIG. 12 is a flowchart illustrating a process for displaying information performed in the device control system according to the third embodiment of the present disclosure.

FIG. 12 is a flowchart illustrating the process for displaying information performed in the device control system according to the third embodiment of the present disclosure.

Processing in steps S51 to S53 illustrated in FIG. 12 is the same as processing in steps S31 to S33 illustrated in FIG. 7, and accordingly description thereof is omitted. Processing in steps S54 and S55 illustrated in FIG. 12 is the same as processing in steps S44 and S45 illustrated in FIG. 9, and accordingly description thereof is omitted.

If the speech recognition determination unit 208 determines that it is difficult to perform speech recognition (NO in step S55), the notification unit 210 notifies the user of speech recognition availability information indicating that it is difficult to perform speech recognition (step S56). Alternatively, the notification unit 210 may notify the user whether current conditions are suitable to input a speech command. The notification unit 210 notifies, on the basis of the information stored in the ambient sound information database 204, the user whether it is possible to perform speech recognition in a sound environment estimated from current operation states of the devices 120. Alternatively, after notifying the user of the current conditions, the notification unit 210 may prompt the user to control the devices 120 in order to establish a sound environment in which speech recognition can be performed. The speech recognition availability information need not be information indicating that it is difficult to perform speech recognition. The speech recognition availability information may include information indicating that speech recognition can be performed.

If the server apparatus 100 and the display apparatus (a television set, a smartphone, a tablet computer, a PC, or the like) are connected to each other through a network in this device control system, current conditions of ambient sound are displayed on the display apparatus.

Figure 13:
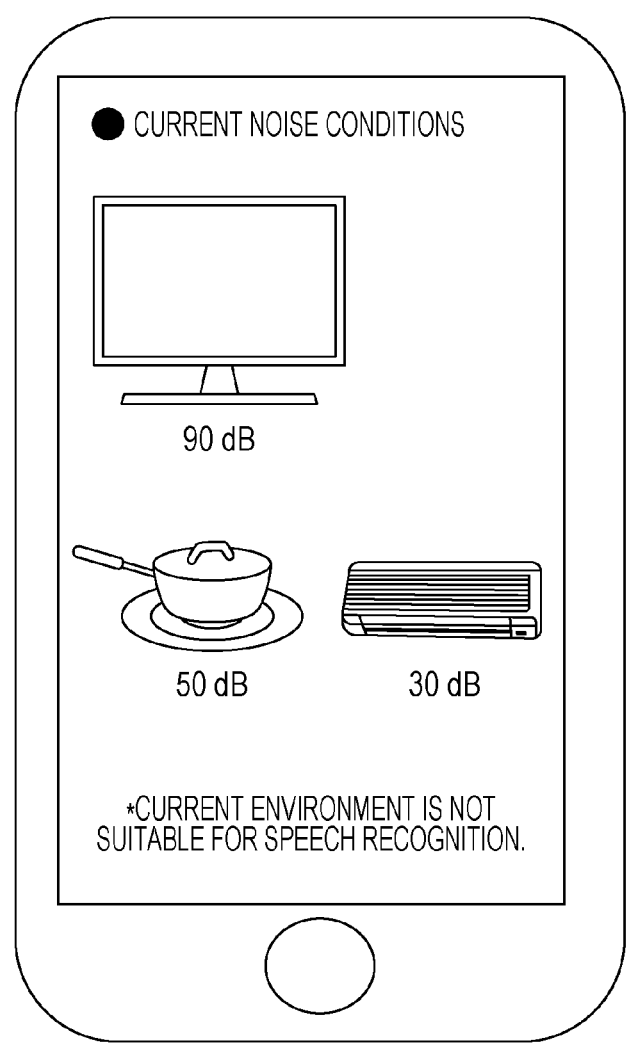
FIG. 13 is a diagram illustrating an example of a display screen displayed on the display apparatus when a user is notified that it is difficult to perform speech recognition.

FIG. 13 is a diagram illustrating an example of a display screen displayed on the display apparatus when the user is notified that it is difficult to perform speech recognition.

As illustrated in FIG. 13, the display screen includes images of a plurality of devices in operation and noise values (sound volume) of the plurality of devices. The database management unit 203 calculates the noise values of the plurality of devices from ambient sound obtained by the ambient sound obtaining unit 201. The noise values of the plurality of devices may be stored in advance while being associated with the operation states of the plurality of devices. At this time, as illustrated in FIG. 13, the display apparatus may display a device having a largest noise value larger than the other devices. As illustrated in FIG. 13, the display apparatus may indicate that current noise conditions are not suitable for speech recognition.

After seeing the speech recognition availability information indicating that it is difficult to perform speech recognition, the user changes the operation states of the devices in order to reduce ambient sound. Thus, it is possible to prompt the user to change the operation states of the devices and reduce noise (ambient sound) that hinders speech recognition.

As described above, according to the device control system according to the third embodiment, the user can easily understand the current operation states of the devices and the current noise conditions. In addition, the user can identify a device that is emitting noise.

The method for controlling a device and the device control system in the present disclosure make it possible to perform speech recognition more certainly and are effective as a method for controlling a device and a device control system that control a plurality of devices on the basis of a speech command from the user.

What is claimed is:

1. A method for controlling a plurality of electrically-controllable devices that are connected to a communication network provided in a physical structure on the basis of a speech command from a user, the method comprising:
    obtaining ambient sound around the plurality of electrically-controllable devices, using a plurality of microphones connected to the communication network, at a first time;
    obtaining operation states of the plurality of electrically-controllable devices, using sensors at the first time from the plurality of electrically-controllable devices, through the communication network;
    storing, in a database in a storage memory, the operation states of the plurality of electrically controllable devices at the first time obtained in the obtaining the operation states of the plurality of electrically-controllable devices at the first time and the ambient sound obtained at the first time in the obtaining the ambient sound while associating the operation states and the ambient sound with each other;
    obtaining the speech command, using a microphone, from the user at a second time, which is different from the first time; and
    controlling, by a controller connected to the communication network, an operation state of an electrically-controllable device based on the speech command from the user in order to reduce ambient sound at the second time, based on the stored operation states of the plurality of electrically controllable devices at the first time that are associated with the stored ambient sound at the first time.

2. The method according to claim 1, further comprising:
    obtaining the operation states of the plurality of electrically-controllable devices at the second time from the plurality of electrically-controllable devices through the communication network; and
    removing, if the database stores operation states that match the operation states of the plurality of electrically-controllable devices at the second time obtained in the obtaining the operation states of the plurality of electrically-controllable devices at the second time, noise from the speech command on the basis of ambient sound stored and associated with the operation states in the database.

3. The method according to claim 1, further comprising:
    obtaining the operation states of the plurality of electrically-controllable devices at the second time from the plurality of electrically-controllable devices through the communication network;
    determining, if the database stores operation states that match the operation states of the plurality of electrically-controllable devices at the second time obtained in the obtaining the operation states of the plurality of electrically-controllable devices at the second time, whether it is possible to perform speech recognition in a sound environment estimated from ambient sound stored and associated with the operation states in the database; and
    notifying the user of a result of the determination made in the determining.

4. The method according to claim 3,
    wherein, in the storing, the database also stores the operation states of the plurality of electrically-controllable devices at the first time obtained in the obtaining the operation states of the plurality of electrically-controllable devices at the first time and volume of sound emitted by the plurality of electrically-controllable devices while associating the operation states and the volume with each other, and
    wherein, if it is determined in the determining that the database stores operation states that match the operation states of the plurality of electrically-controllable devices at the second time obtained in the obtaining the operation states of the plurality of electrically-controllable devices at the second time, it is determined whether it is possible to perform speech recognition by determining whether volume of the ambient sound, which includes the sound emitted by the plurality of electrically-controllable devices, associated with the operation states in the database is lower than or equal to a certain level at which it is possible to perform speech recognition.

5. The method according to claim 4,
    wherein, if it is determined in the determining that it is difficult to perform speech recognition, the volume of the sound emitted by the plurality of electrically-controllable devices is associated with the plurality of electrically-controllable devices and presented to the user.

6. The method according to claim 1, further comprising:
    obtaining the operation states of the plurality of electrically-controllable devices at the second time from the plurality of electrically-controllable devices through the communication network;
    determining, if the database stores operation states that match the operation states of the plurality of electrically-controllable devices at the second time obtained in the step of obtaining the operation states of the plurality of electrically-controllable devices at the second time, whether it is possible to perform speech recognition in a sound environment estimated from ambient sound stored and associated with the operation states in the database;

identifying, if it is determined in the determining that it is difficult to perform speech recognition, at least one of the plurality of electrically-controllable devices that is emitting the ambient sound; and controlling the operation state of a certain electrically-controllable device among the at least one of the plurality of electrically-controllable devices that is emitting the ambient sound in order to establish a sound environment in which it is possible to perform speech recognition.

7. The method according to claim 6, further comprising:
notifying, if it is determined in the determining that it is difficult to perform speech recognition, the user of the operation state of the certain electrically-controllable device to be controlled among the at least one of the plurality of electrically-controllable devices that is emitting the ambient sound identified in the identifying and how the certain electrically-controllable device is controlled.

8. The method according to claim 6,
wherein the database also stores information indicating whether speech recognition was successful in past while associating the information with the operation states, and
wherein, if it is determined in the determining that it is difficult to perform speech recognition, the plurality of electrically-controllable devices are controlled in the controlling in such a way as to operate in operation states stored in the database in which speech recognition was successful in the past.

9. The method according to claim 1, further comprising:
detecting whether the speech command has not been input for a certain period of time,
wherein, if it is detected in the detecting that the speech command has not been input for the certain period of time, the ambient sound around the plurality of electrically-controllable devices is obtained in the obtaining the ambient sound.

10. The method according to claim 1, further comprising:
detecting a person around the plurality of electrically-controllable devices,
wherein, if a person is not detected in the detecting a person, the ambient sound around the plurality of electrically-controllable devices is obtained in the obtaining the ambient sound.

11. The method according to claim 1,
wherein, if the database does not store operation states that match the operation states of the plurality of electrically-controllable devices at the first time obtained in the obtaining the operation states of the plurality of electrically-controllable devices at the first time, the ambient sound around the plurality of electrically-controllable devices is obtained in the obtaining the ambient sound.

12. A device control system that controls a plurality of electrically-controllable devices that are connected to a communication network on the basis of a speech command from a user, the device control system comprising:
an ambient sound obtainer that uses a plurality of microphones connected to the communication network that obtains ambient sound around the plurality of electrically-controllable devices at a first time;
an operation state obtainer that uses sensors and that obtains the operation states of the plurality of electrically-controllable devices at the first time from the plurality of electrically-controllable devices through the communication network; and
a database manager that stores in a database in a storage memory the operation states at the first time obtained by the operation state obtainer and the ambient sound obtained by the ambient sound obtainer at the first time in a database while associating the operation states and the ambient sound with each other,
wherein the device control system obtains the speech command, using a microphone, from the user at a second time, which is different from the first time; and
wherein the device control system controls, by a controller connected to the communication network, an operation state of an electrically-controllable device in order to reduce ambient sound at the second time, based on the speech command from the user and on the stored operation states of the plurality of electrically controllable devices at the first time that are associated with the stored ambient sound at the first time.

\* \* \* \* \*